(12) United States Patent
Raby

(10) Patent No.: US 6,243,658 B1
(45) Date of Patent: Jun. 5, 2001

(54) TILT PREDICTION FOR TOTAL STATION

(75) Inventor: Peter Raby, London (GB)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/584,907

(22) Filed: May 30, 2000

Related U.S. Application Data

(63) Continuation of application No. 09/133,994, filed on Aug. 14, 1998, now Pat. No. 6,138,367.

(51) Int. Cl.[7] .................................................. G01C 5/00
(52) U.S. Cl. ............................... 702/151; 33/291; 702/94
(58) Field of Search ..................................... 702/151, 154, 702/94; 356/149, 138; 33/290, 291

(56) References Cited

U.S. PATENT DOCUMENTS

| 4,136,955 | * | 1/1979 | Aeschlimanne et al. | 356/152 |
|---|---|---|---|---|
| 4,521,973 | * | 6/1985 | Wiklund et al. | 33/366 |
| 4,717,251 | * | 1/1988 | Wells et al. | 356/4 |
| 5,671,160 | * | 9/1997 | Julian | 364/559 |
| 5,841,353 | * | 11/1998 | Chisholm et al. | 340/689 |
| 5,991,706 | * | 11/1999 | Tsukamoto et al. | 702/182 |
| 6,014,109 | * | 1/2000 | Raby | 343/765 |
| 6,024,655 | * | 2/2000 | Coffee | 473/407 |
| 6,119,355 | * | 9/2000 | Raby | 33/291 |

* cited by examiner

Primary Examiner—Patrick Assouad
(74) Attorney, Agent, or Firm—Wagner, Murabito & Hao LLP

(57) ABSTRACT

A tilt predictor incorporated into a total station to predict the degree of tilt of the rotational alidade portion of a total station corresponding to the rotational orientation of the rotational alidade portion. In one embodiment, the present invention defines the plane of rotation for the rotational alidade portion with the rotational alidade portion disposed in a first rotational orientation. The rotational alidade portion is then rotated to the desired rotational orientation. This embodiment then predicts the degree of tilt of the rotational alidade portion at the desired rotational orientation.

24 Claims, 9 Drawing Sheets

TILT PREDICTION FOR TOTAL STATION

This is a continuation of application Ser. No. 09/133,994 filed on Aug. 14, 1998 now U.S. Pat. No. 6,138,367.

TECHNICAL FIELD

The present invention relates to survey instrumentation. In particular, the present invention pertains to a total station.

BACKGROUND ART

Total stations are precision survey instruments that allow a user to electronically measure the distance, as well as the vertical and horizontal angles, between the total station and any points to be surveyed. These types of measurements require a high degree of accuracy, with acceptable tolerances measured in arc-seconds for angles and millimeters for distance. In addition to the demand for precision, it is also important that these instruments be easy and convenient to use, because of the difficult terrain and other extreme conditions that may be present in the location where the total station is to be employed.

When using a total station, it is necessary for the user to precisely level the instrument within a manufacturer-specified range before measurements are taken. In the prior art, electronic tilt sensors are a well-known and commonly used means of establishing whether the total station, in particular the rotational alidade portion of the total station, is level. The tilt sensors are typically integrated into the total station, and the data from the tilt sensors are visually displayed to the user on a screen present on the total station.

In one prior art total station, an electronic tilt sensor is comprised of a vial filled with fluid. The fluid in the vial is free to move, so that if the tilt sensors are not level, the level of the fluid in the vial is different from the fluid level if the tilt sensors are level. In another prior art total station, an electronic tilt sensor includes elements suspended by wires that are used to determine the relationship between the vertical axis of the instrument and the true vertical line. The amount of tilt is measured in arc-seconds. Typical electronic tilt sensors are capable of measurements within one (1) arc-second of angle.

The tilt sensor may be affected by the ambient conditions where the total station is being used. Thus, a bias of unknown quantity may be introduced into the level measurement provided by the tilt sensors if the ambient conditions at the survey site are significantly different from those present when the tilt sensors were calibrated. There may also be biases introduced due to other factors. Because of the demand for precision, it is necessary to quantify the total bias in the tilt sensors and account for it when the rotational alidade portion is leveled. To account for the ambient effects, the tilt sensors are calibrated at the site where the total station will be used.

The bias in the tilt sensors is quantified using a known procedure. The known procedure involves measuring the angle of tilt twice. After the total station is set up, the rotational alidade portion is set at an initial rotational orientation and the angle of tilt is measured. The rotational alidade portion is then rotated approximately 180 degrees from its initial position and a second measurement of the angle of tilt is taken. Because the rotational alidade portion rotates in a fixed plane, the average of the values of the two measurements provides the bias in the tilt sensors. If the sensors are perfectly level with respect to the bearings in the base of the rotational alidade portion, then the average of the two measurements will be zero, provided the instrument is level within the range of the sensors. Once the bias is known, the tilt sensors can be calibrated to account for the bias and the true angle of tilt can be determined. The rotational alidade portion is then leveled according to the true angle of tilt.

After the rotational alidade portion has been leveled, it may subsequently deviate slightly from the level position. For example, uneven thermal expansion in the legs of the tripod upon which the total station is mounted may cause the total station, and consequently the rotational alidade portion, to tilt slightly. As discussed above, the acceptable tolerances for measurements taken using a total station are very tight, and thus even a very small degree of tilt introduced after the total station has been initially leveled must be accounted for.

With reference to Prior Art FIG. 1A, total station 100 and rotational alidade portion 102 are tilted in the horizontal direction; that is, they are leaning slightly forward on inclined horizontal plane 110. Inclined horizontal plane 110 forms horizontal angle of inclination $\theta$ relative to and below true horizontal plane 120.

With reference now to Prior Art FIG. 1B, after rotational alidade portion 102 has been rotated 180 degrees from its initial rotational orientation, rotational alidade portion 102 is now pointing slightly upward, again forming horizontal angle of inclination $\theta$ relative to true horizontal plane 120, with horizontal angle of inclination $\theta$ now above true horizontal plane 120. With rotational alidade portion 102 rotated less than 180 degrees from its initial orientation in either direction, there will still be a horizontal tilt, although the horizontal angle of inclination will be less than $\theta$ (rotational alidade portion 102 will pass through one point where horizontal angle of inclination $\theta$ is zero). Note that the angle between the axis of rotation of rotational alidade portion 102, designated by 130, and true vertical plane 135 is also the angle $\theta$.

With reference to Prior Art FIG. 2, prior art total stations are equipped with a tilt compensator to compensate for the degree of tilt based on the data from the tilt sensors. Thus, it is not necessary for the user to continuously re-level the total station prior to each measurement. In the prior art, the horizontal angle of inclination is measured by the tilt sensors at each new rotational orientation of the rotational alidade portion. In the prior art, at each new rotational orientation the tilt compensator monitors the horizontal angle of inclination determined by the tilt sensors, calculates a compensation factor, and applies the compensation factor to correct the measurements taken with the total station. The measurement results are then displayed to the user of the total station on screen 222 located on rotational alidade portion 208. The measurement results are displayed in units of degrees 223, minutes (arc-minutes) 224, and seconds (arc-seconds) 225.

As discussed above, the tilt sensors in the prior art are comprised of either a vial filled with fluid or elements suspended by wires. Hence, when the rotational alidade portion is rotated to a new orientation, the acceleration forces created by the rotation cause the fluid or the suspended elements in the tilt sensors to move back and forth. In other words, after the rotational alidade portion is rotated to a new orientation, the fluid or suspended elements within the tilt sensors are not stable. In the prior art, a period of time must pass before the fluid or suspended elements return to the equilibrium condition that allows there to be an accurate measurement of the amount of tilt of the rotational alidade portion.

Therefore, one disadvantage to prior art total stations is that there is a time lag between the time the rotational alidade portion is rotated and the time that the tilt sensors are capable of providing an accurate measurement of the degree of tilt at the new rotational orientation. Thus, in the prior art, there is also a time lag before the tilt compensator can be accurately used. In the prior art, the user of the-total station is therefore inconvenienced after the rotational alidade portion is rotated because he or she must wait until the tilt sensors have reached equilibrium before proceeding with the desired measurements. In addition, other work may be held up while waiting for the results of survey measurements thereby increasing labor costs.

Another disadvantage to prior art total stations is that survey measurements taken before the tilt sensors reach equilibrium are only approximate, because the tilt compensator does not have an accurate measurement of the horizontal angle of inclination and so cannot calculate a precise compensation factor. Hence, in the prior art, the smallest units of measure that are typically available until the tilt sensors reach equilibrium are units of degrees. In one prior art approach, with reference again to FIG. 2, minutes 224 and seconds 225 are displayed, but rapidly scroll from one value to another as the measured values of minutes and seconds increase and decrease while the fluid or suspended elements in the tilt sensors oscillate back and forth. In another prior art approach, the display of minutes 224 and seconds 225 are left blank until the tilt sensors reach equilibrium and the degree of tilt is able to be accurately measured. Thus, another disadvantage to the prior art is that precise measurement results cannot be obtained or displayed to the user of the total station until the tilt sensors have reached equilibrium, again delaying and inconveniencing the user.

Thus, a need exists for a total station that allows the degree of tilt of the rotational alidade portion to be quickly determined after the rotational alidade portion has been rotated to a new orientation, without the time lag that occurs before the tilt sensors reach equilibrium. Another need exists for a total station that meets the above need and also displays precise measurement results to a user without the aforementioned time lag, so that the user is not further inconvenienced. Still another need exists for a total station that meets the above needs and also automatically determines the degree of tilt and applies it in the total station tilt compensator. A still further need exists for a total station that meets the above needs, and is user-friendly and compatible with the current practices and training of those who will be using the total station.

DISCLOSURE OF THE INVENTION

The present invention provides a total station that eliminates the time lag associated with determining the degree of tilt of the rotational alidade portion after the rotational alidade portion has been rotated to a new rotational orientation. The present invention also displays precise measurement results to a user without the aforementioned time lag. The present invention also provides a total station that automatically determines the degree of tilt of the rotational alidade portion, and applies the degree of tilt in the total station tilt compensator. The present invention further provides a total station that accomplishes the above, and is user-friendly and compatible with the current practices and training of those currently using total stations. The invention described herein incorporates a tilt predictor into a total station to predict the degree of tilt of the rotational alidade portion of a total station corresponding to the rotational orientation of the rotational alidade portion.

Specifically, in one embodiment, the present invention defines the plane of rotation for the rotational alidade portion with the rotational alidade portion disposed in a first rotational orientation. The rotational alidade portion is then rotated to a desired rotational orientation. This embodiment predicts the degree of tilt of the rotational alidade portion at the desired rotational orientation.

In one embodiment, the present invention includes the steps of the above-described embodiment and further recites using a tilt sensor of the total station to define the plane of rotation of the rotational alidade portion.

In another embodiment, the present invention includes the steps of the above-described embodiment and further recites determining an adjustment factor to account for the effects of the bearings on which the rotational alidade portion is mounted. The tilt predictor applies the adjustment factors to more precisely determine the degree of tilt of the rotational alidade portion.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

PRIOR ART

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 3:
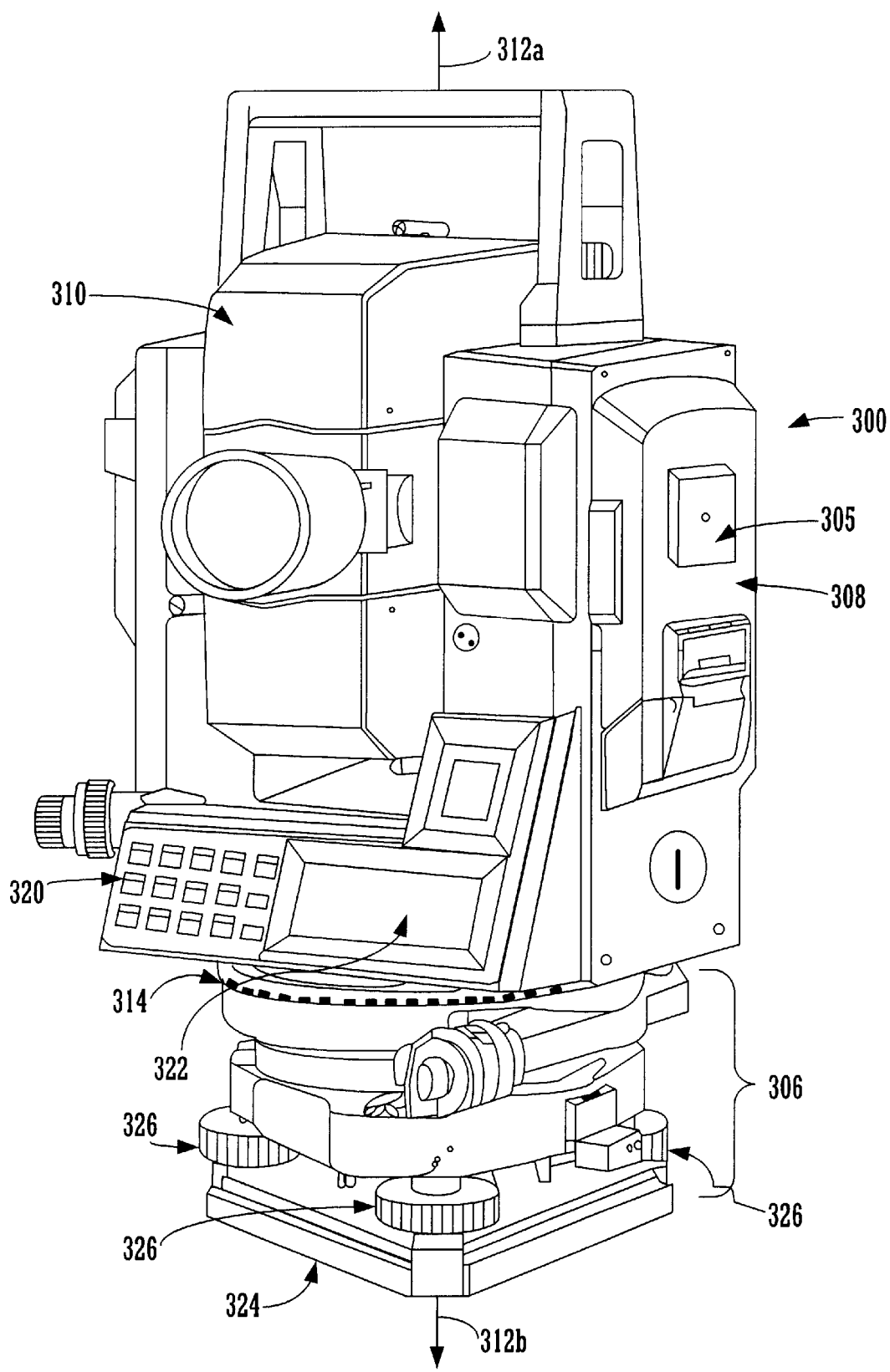
FIG. 3 is a perspective view of a total station in accordance with one embodiment of the present invention.

With reference now to FIG. 3, a perspective view of one embodiment of a total station used in accordance with the present invention is shown. Total station 300 is comprised of base portion 306, rotational alidade portion 308, and electronic distance measuring portion 310. Rotational alidade portion 308 is adapted to rotate on base portion 306 about a vertical central axis represented by arrows 312a and 312b. That is, rotational alidade portion 308 is able to rotate 360 degrees on base 306. Rotational alidade portion 308 rotates in a plane on bearings 314.

Electronic distance measuring portion 310 is adapted to swivel upwards or downwards within rotational alidade portion 308. In so doing, it is possible to aim electronic distance measuring portion 310 toward a wide variety of elevations and in any of the 360 degrees through which rotational alidade portion 308 can be rotated. An angle encoder (not shown) is used to electronically measure the azimuthal orientation of rotational alidade portion 308.

With reference still to FIG. 3, keyboard 320 and screen 322 are employed by the user to input commands and to communicate with total station 300.

With continued reference to FIG. 3, in the present embodiment rotational-alidade portion 308 is mounted on top of a tripod (not shown) by means of tribrach 324. Tribrach 324 is attached to the tripod, and rotational alidade portion 308 is then locked into the tribrach. The present embodiment utilizes electronic tilt sensors (not shown) to determine whether total station 300, in particular rotational alidade portion 308, is level. In the present embodiment, two tilt sensors are located in the plane defined by the rotation of rotational alidade portion 308, and the two tilt sensors are in a known orientation relative to the orientation rotational alidade portion 308 and relative to each other (i.e., the tilt sensors are oriented at either a 90 degree angle to each other). In another embodiment, a single tilt sensor that measures simultaneously in both the x-direction and the y-direction is used. Each electronic tilt sensor is calibrated using a known prior art technique to account for measurement bias introduced by the ambient conditions and other such effects. In this embodiment, foot screws 326 provide fine motion control and are adjusted by the user until the readouts from the electronic tilt sensors indicate that total station 300, specifically rotational alidade portion 308, is level within desired or acceptable limits.

Continuing with reference to FIG. 3, in the present embodiment, once rotational alidade portion 308 is made level, any subsequent degree of tilt of rotational alidade portion 308 from the level position is measured using tilt predictor 305 that functions as described in detail below. First, with rotational alidade portion 308 in a first rotational orientation, each tilt sensor of total station 300 measures an angle of horizontal inclination relative to the true horizontal plane. Next, in this embodiment, the angles of horizontal inclination measured by each tilt sensor are used to define the angle of the plane on which rotational alidade portion 308 rotates.

Rotational alidade portion 308 is then rotated to a selected rotational orientation. In this embodiment, an angle encoder (not shown) automatically measures the amount of rotation from the first rotational orientation to the selected rotational orientation to establish the position of the rotational alidade portion in the new rotational orientation. It is appreciated that in other embodiments of the present invention, the position of the rotational alidade portion is determined using other methods. For example, instead of measuring from the initial rotational orientation, the amount of rotation to the selected rotational orientation can be measured from a rotational orientation subsequent to the initial rotational orientation, such as the rotational orientation just preceding the selected rotational orientation.

Next, continuing with reference to FIG. 3, in this embodiment tilt predictor 305 automatically calculates the angle of horizontal inclination at the new rotational orientation using the plane defined previously. This process is described in greater detail below in conjunction with FIG. 4.

In the manner described above, the present embodiment does not rely on the tilt sensors to determine the degree of tilt in the new rotational orientation. Thus, unlike the prior art described previously herein, the present embodiment is able to quickly predict the degree of tilt of rotational alidade portion 308 (FIG. 3), and thereby eliminate the time lag associated with waiting for the tilt sensors to reach the equilibrium condition that is required in order for the tilt sensors to function accurately. In the present embodiment, the degree of tilt predicted by tilt predictor 305 is used by the tilt compensator to correct the measurements taken with a total station. The tilt compensator is therefore also available without a time lag. Thus, in the present embodiment the tilt compensator is constantly available, and the user is able to promptly take the desired measurements and view the precise results on the display screen.

Figure 4:
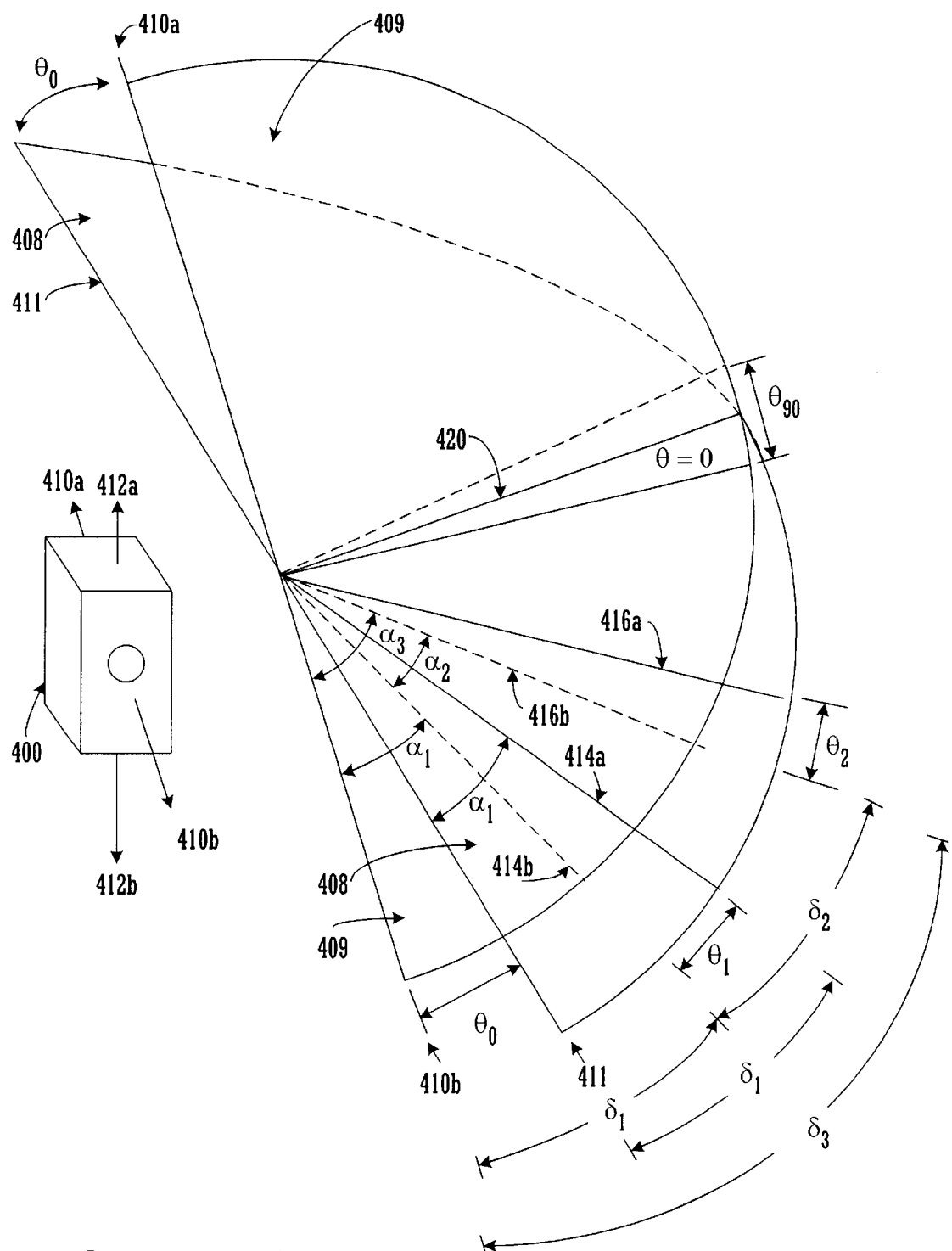
FIG. 4 is an illustration of the plane of rotation of the rotational alidade portion of a total station in accordance with the present invention.

With reference now to FIG. 4, rotational alidade portion 400 is initially in a rotational orientation defined by the horizontal axis designated by 410a and 410b, and rotates about a central axis designated by 412a and 412b. If rotational alidade portion 400 is level, it would rotate in true horizontal plane 408. However, due to a tilt in the horizontal direction, rotational alidade portion 400 actually rotates in inclined horizontal plane 409, and is initially in a rotational orientation defined by the horizontal axis designated by 411. Both horizontal axis 410a–410b and horizontal axis 411 represent the same rotational orientation for rotational alidade portion 400 but lie in different planes. Inclined horizontal plane 409 intersects true horizontal plane 408 at line 420 when horizontal angle of inclination θ is zero and rotational alidade portion 400 is level in the horizontal plane.

With reference still to FIG. 4, a measurement of the horizontal angle of inclination of rotational alidade portion 400 is made in the initial rotational orientation, defined by either horizontal axis 410a–410b or horizontal axis 411. In this embodiment, the measurement of the horizontal angle of inclination is made using two tilt sensors (not shown). In the present embodiment, the two tilt sensors are located in the plane defined by the rotation of rotational alidade portion 400, and are in a known orientation relative to each other (e.g., the tilt sensors are oriented at a 90 degree angle to each other). In another embodiment, one tilt sensor is used to measure simultaneously in both the x-direction and the y-direction.

In the present embodiment, one tilt sensor measures horizontal angle of inclination $\theta_0$ relative to true horizontal plane 408. Thus, horizontal axis 410a–410b and horizontal axis 411 form horizontal angle of inclination $\theta_0$. Similarly, the second tilt sensor measures horizontal angle of inclination $\theta_{90}$ relative to true horizontal plane 408, where $\theta_{90}$ is oriented 90 degrees from $\theta_0$. The present embodiment thus uses these two measurements of horizontal angle of inclination to define inclined horizontal plane 409. The maximum horizontal angle of inclination $\theta_{max}$ is derived from $\theta_0$ and $\theta_{90}$: $\theta_0=\theta_{max}\cos\alpha$ and $\theta_{90}=\theta_{max}\sin\alpha$.

Figure 1A:
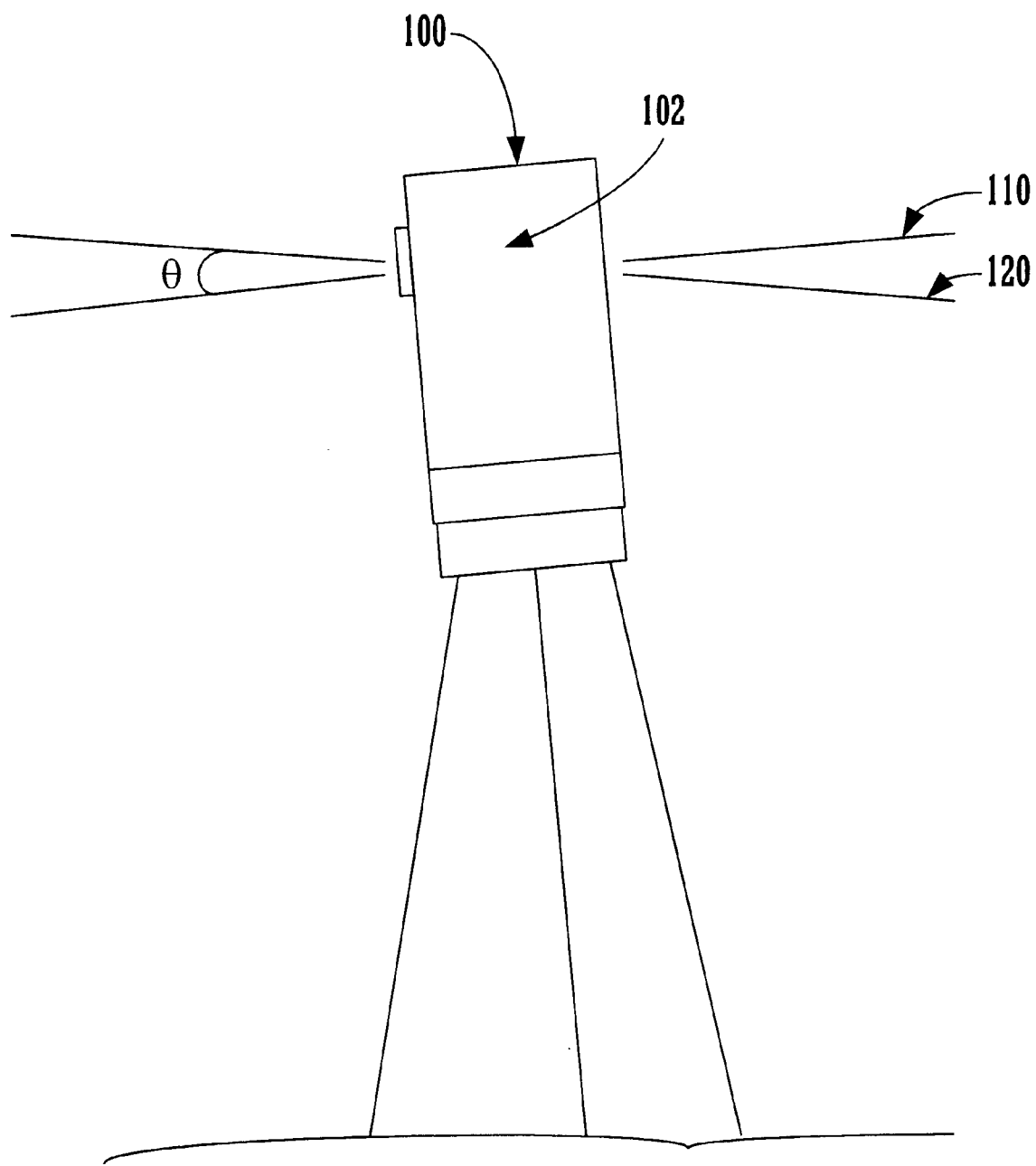
FIGS. 1A and 1B are illustrations of a side view of a prior art total station.
Figure 1B:
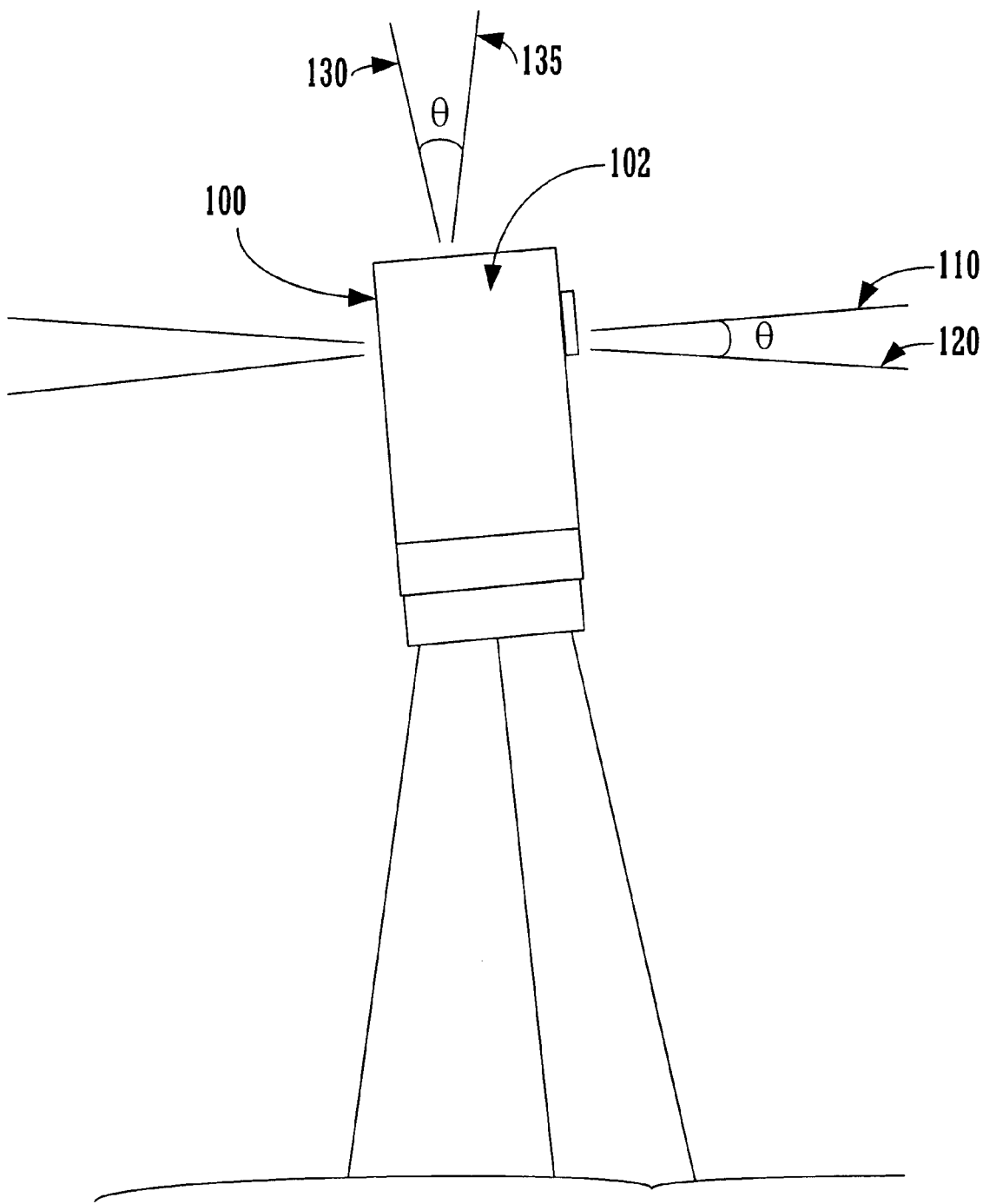
Figure 2:
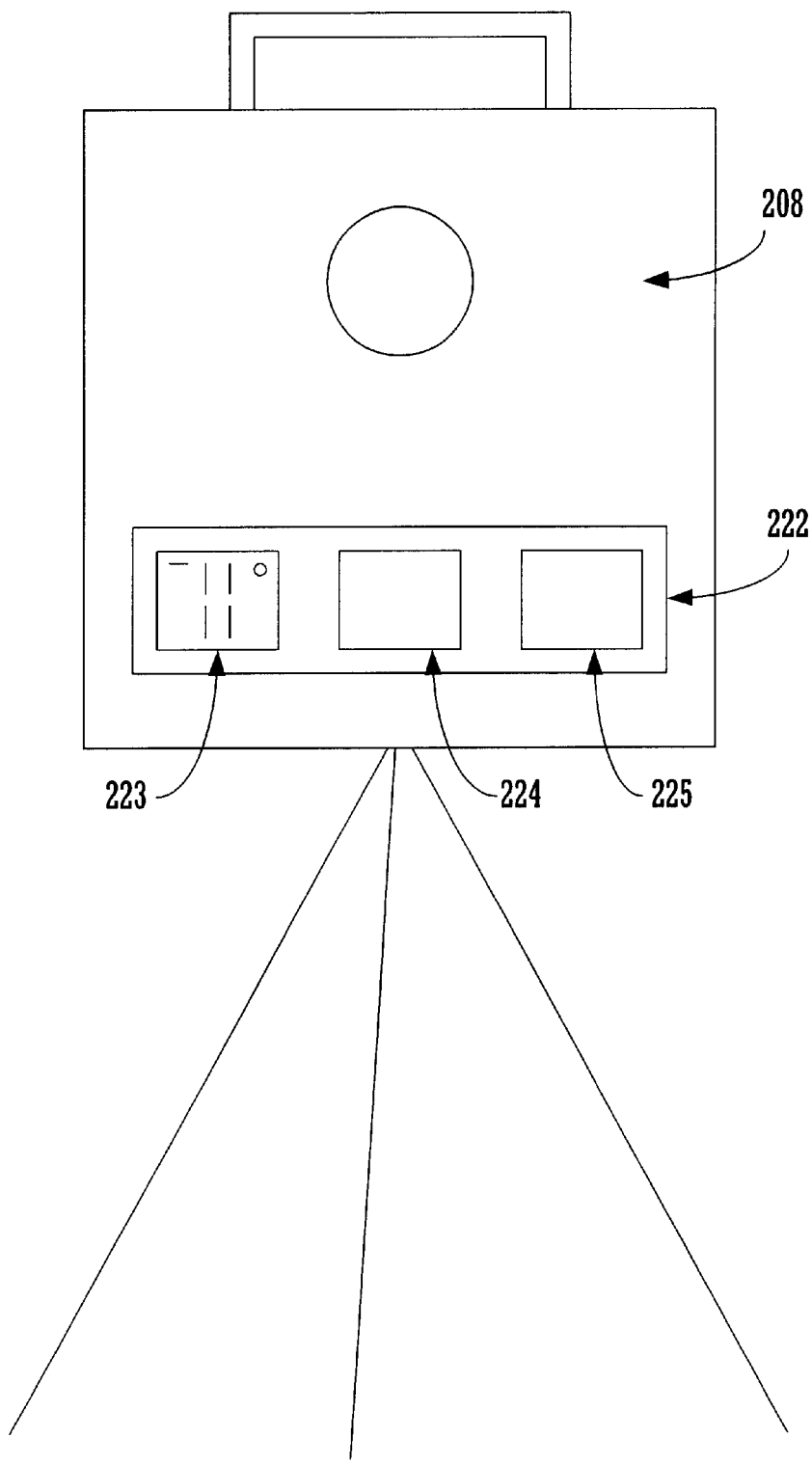
FIG. 2 is an illustration of the display screen of a prior art total station.

With reference still to FIG. 4, rotational alidade portion 400 is then rotated about central axis 412a–412b until it is in the rotational orientation designated by the horizontal axes labeled 414a and 414b. As before, horizontal axis 414a and horizontal axis 414b both represent the same rotational orientation but simply lie in different planes. As such, the angle of rotation $\alpha_1$ from 411 to 414a and from 410b to 414b is the same. Similarly, the length of the arc of travel $\delta_1$ from 411 to 414a and from 410b to 414b is the same. At this rotational orientation, horizontal axis 414a and horizontal axis 414b form horizontal angle of inclination $\theta_1$, where $\theta_1$ is less than $\theta_0$. Thus, at this rotational orientation, rotational alidade portion 400 is also at horizontal angle of inclination $\theta_1$ relative to true horizontal plane 408. With reference back to Prior Art FIGS. 1A and 1B, horizontal angle of inclination $\theta$ is the same for both the plane of rotation of the rotational alidade portion 100 and the angle formed by axis of rotation 130 and true vertical plane 135. Thus, once the horizontal angle of inclination is known for the plane of rotation, the degree of tilt of the rotational alidade portion is also known. In summary, with reference again to FIG. 4, the above discussion illustrates that the horizontal angle of inclination of rotational alidade portion 400 is a function of either the angle of rotation or the arc of travel. That is, $\theta=f(\alpha)$ or $\theta=f(\delta)$.

With continued reference to FIG. 4, in this embodiment, the angle encoder (not shown) automatically measures angle of rotation $\alpha_1$ from the initial rotational orientation to the first desired rotational orientation indicated by horizontal axis 414b. In one embodiment, the angle encoder instead automatically measures arc of travel $\delta_1$ from the initial rotational orientation to the desired rotational orientation. In this embodiment, the tilt predictor then automatically calculates horizontal angle of inclination $\theta_1$ of both inclined horizontal plane 409 and rotational alidade portion 400 at the first desired rotational orientation.

With reference still to FIG. 4, rotational alidade portion 400 is then rotated to a second desired rotational orientation defined by horizontal axis 416b. In the present embodiment, the angle encoder automatically measures angle of rotation $\alpha_3$ from the initial rotational orientation to the second desired rotational orientation. In one embodiment, the angle encoder instead automatically measures arc of travel $\delta_3$ from the initial rotational orientation to the desired rotational orientation. In another embodiment, the angle encoder instead automatically measures the angle of rotation $\alpha_2$ from a prerequisite rotational orientation to the next rotational orientation (in the example of FIG. 4, the prerequisite rotational orientation is the initial rotational orientation). In still another embodiment, the angle encoder instead automatically measures arc of travel $\delta_2$ from a prerequisite rotational orientation to the next rotational orientation. In this embodiment, the tilt predictor then automatically calculates horizontal angle of inclination $\theta_2$ of both inclined horizontal plane 409 and rotational alidade portion 400 at the second desired rotational orientation.

Therefore, with reference still to FIG. 4, for each desired rotational orientation of rotational alidade portion defined by a horizontal axis, with rotational orientation that is either an angle of rotation $\alpha$ or an arc of travel $\delta$ from the initial rotational orientation, there is a horizontal angle of inclination $\theta$ that can be predicted by the tilt predictor in the manner described above.

In one embodiment of the present invention, the plane of rotation is updated at each rotational orientation. That is, as in the present embodiment, the plane of rotation is determined with the rotational alidade portion in the initial rotational orientation. The user then rotates the rotational alidade portion to the selected rotational orientation and takes the desired measurements, and the tilt predictor is used as described above. Before rotating to the next selected rotational orientation, the plane of rotation is redefined at the current selected rotational orientation using the tilt sensors.

In one embodiment of the present invention, the horizontal angle of inclination at each rotational orientation is predicted using the equations that define the plane of rotation of the rotational alidade portion. In another embodiment, the horizontal angles of inclination at each rotational orientation are calculated and tabulated in a database. In this other embodiment, the horizontal angle of orientation at a subsequent rotational orientation is determined by interpolating between values in the database. The database is filled using the results from subsequent rotational orientations, using either actual measurements or interpolated values.

In the present invention, the predicted horizontal angle of inclination is provided by the tilt predictor to the tilt compensator. The tilt compensator calculates and applies a compensation factor based on the predicted horizontal angle of inclination. The design and application of a tilt compensator is known in the prior art. In the present embodiment, the tilt predictor and the tilt compensator are both incorporated into the total station, and are coupled to each other so that data from the tilt predictor can be written to the tilt compensator.

Figure 5:
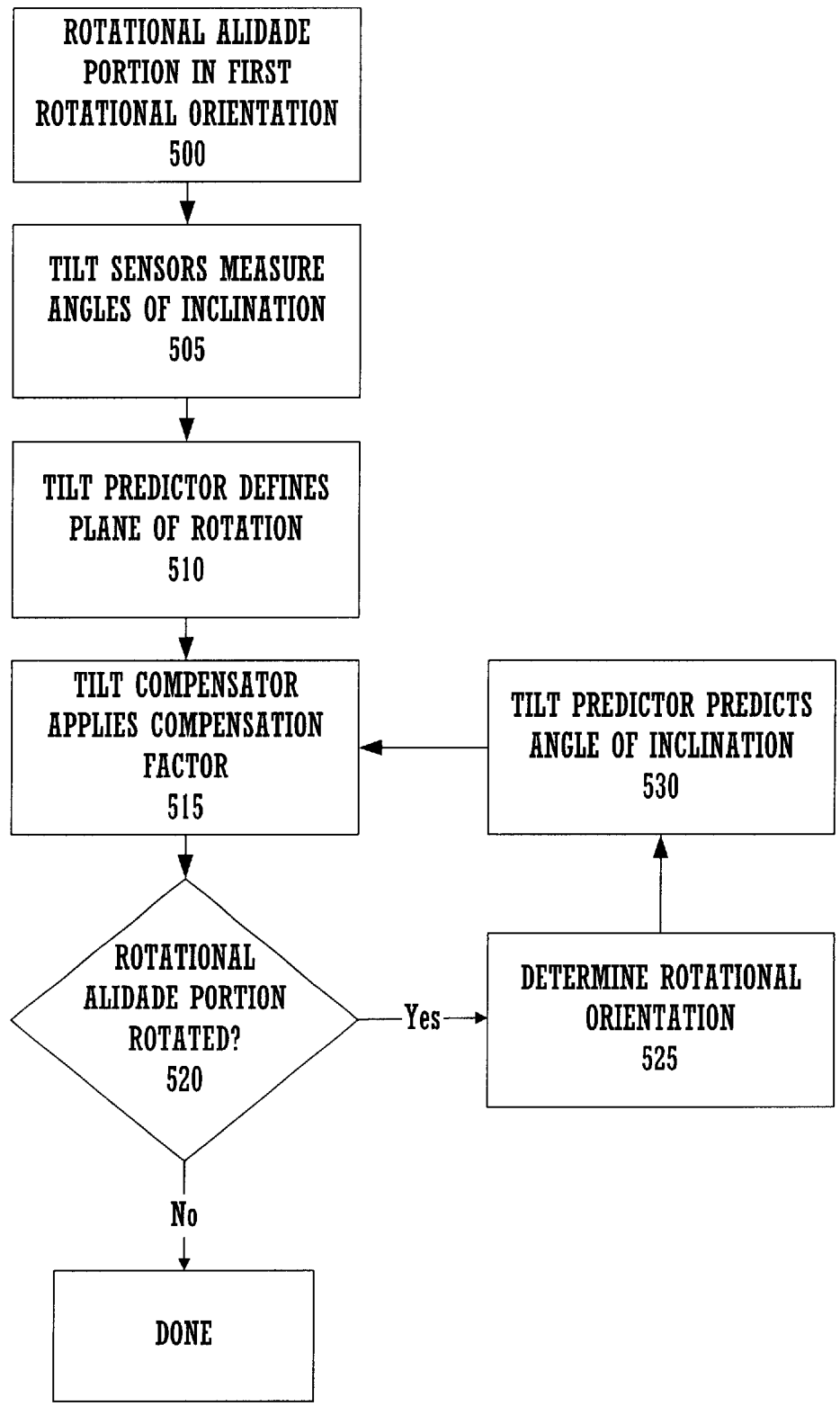
FIG. 5 is a flowchart of a process for tilt prediction in accordance with one embodiment of the present invention.

With reference now to FIG. 5, a flowchart of the process for tilt prediction in accordance with the present embodiment of the present invention is shown. In step 500, the rotational alidade portion is placed in a first rotational orientation and survey measurements may be taken.

In this embodiment, in next step 505 each of the tilt sensors measures a horizontal angle of inclination with the rotational alidade portion in the first rotational orientation.

In this embodiment, in next step 510 the tilt predictor automatically reads and stores the first rotational orientation and the measured horizontal angles of inclination from each of the tilt sensors. From this information, the tilt predictor defines the plane of rotation of the rotational alidade portion.

In this embodiment, in next step 515 the measured angles of inclination are automatically written to the tilt compensator, which calculates and applies a compensation factor to correct survey measurements for the degree of tilt.

With reference still to FIG. 5, in step 520 the rotational alidade portion may be rotated to a subsequent rotational orientation, and survey measurements are taken.

At the subsequent rotational orientation, in this embodiment the tilt sensors are not required to measure the angles of inclination. Instead, in this embodiment in step 525 the tilt predictor automatically calculates the second rotational orientation, and in step 530 predicts the angles of inclination based on the measurements taken by the tilt sensors at the first rotational orientation.

In this embodiment, the predicted angles of inclination are automatically written to the tilt compensator, which in step 515 calculates and applies a compensation factor to correct the survey measurements at the subsequent rotational orientation for the degree of tilt.

Figure 6A:
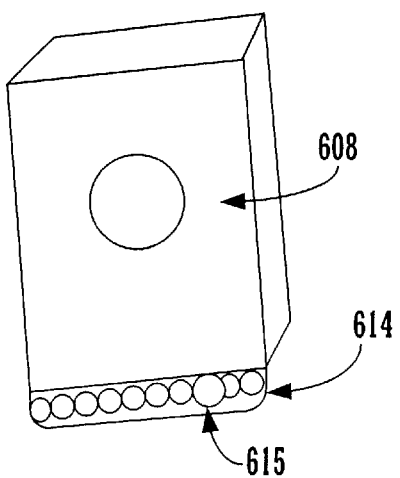
FIGS. 6A and 6B are illustrations of the wobble introduced by the bearings upon which the rotational alidade portion rotates in accordance with one embodiment of the present invention.
Figure 6B:
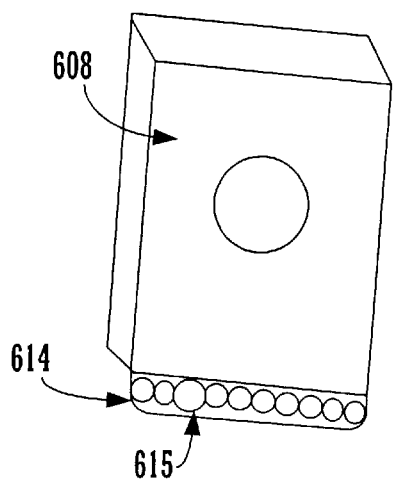

With reference back to FIG. 3, rotational alidade portion 308 is mounted on base 306. In this embodiment, rotational alidade portion 308 rotates on bearings 314. With reference now to FIGS. 6A and 6B, bearings 614 will roll as rotational alidade portion 608 is rotated. Bearings 614 are manufactured with a tight tolerance on bearing diameter, but the range of bearing diameters within the tolerance band will still introduce a slight wobble to the rotational alidade portion as the rotational alidade portion is rotated. With reference still to FIGS. 6A and 6B, the size of bearing 615 is exaggerated to illustrate wobble. With reference to FIG. 6A, rotational alidade portion 608 is slightly tilted as it passes over bearing 615. The rate at which bearing 615 rolls is not the same as the rate at which rotational alidade portion 608 rotates. Thus, with reference now to FIG. 6B, with rotational alidade portion 608 in a different rotational orientation, bearing 615 will still cause rotational alidade portion 608 to tilt slightly, but in a different direction.

Figure 7:
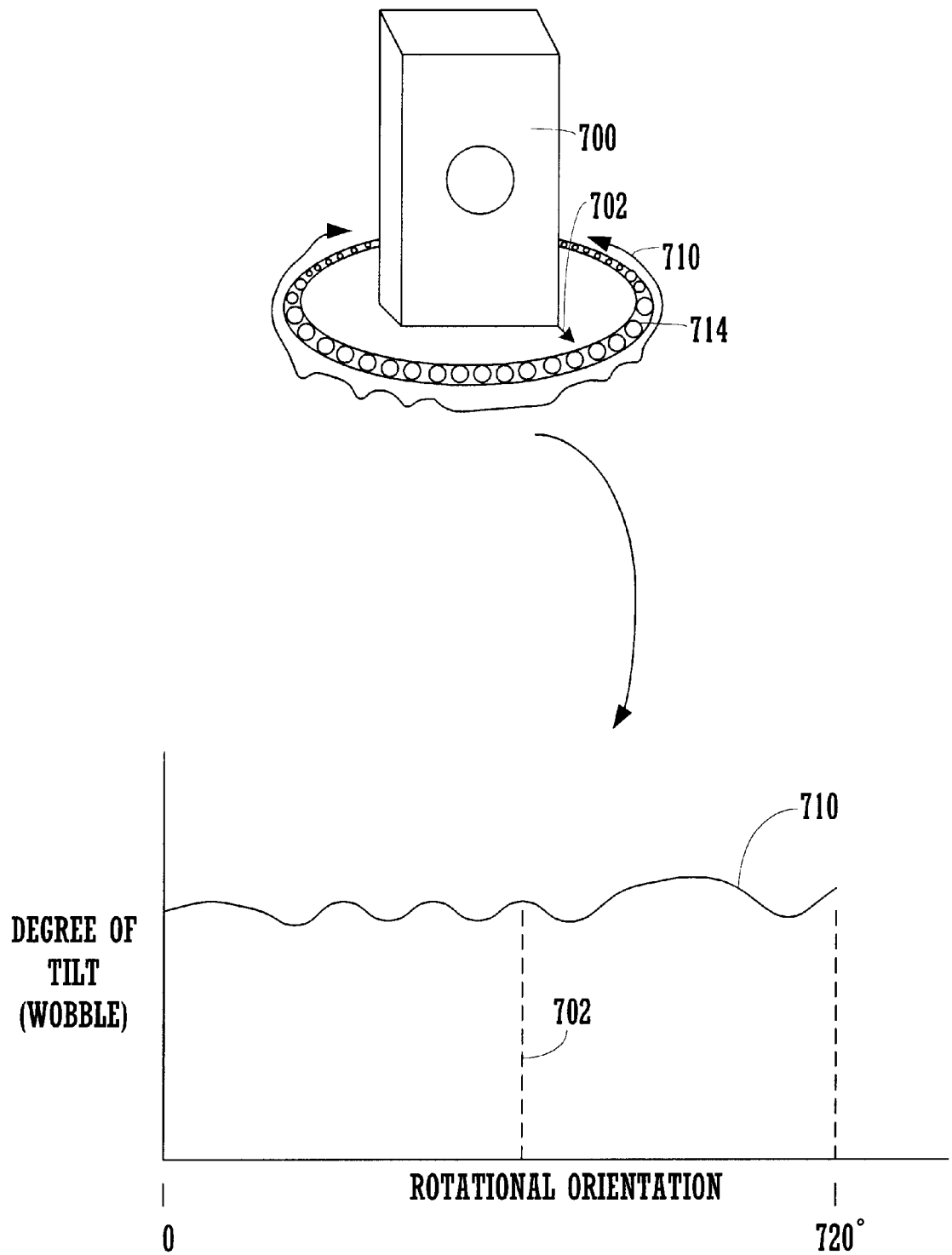
FIG. 7 is an illustration of the wobble introduced by the bearings upon which the rotational alidade portion rotates in accordance with one embodiment of the present invention.

With reference to FIG. 7, in one embodiment of the present invention, the tilt predictor accounts for the effect of the bearing wobble on the degree of tilt of the rotational alidade portion. In one embodiment, the tilt predictor includes an adjustment factor that is derived based on the wobble introduced by the bearings. In one embodiment the wobble introduced by bearings 714 is mapped as a function of the rotational orientation of rotational alidade portion 700. In one embodiment, wobble map 710 is read into and stored in the total station tilt predictor (not shown). Bearings 714 rotate at a rate such that they are in their original orientation after two complete rotations of the rotational alidade portion. Thus, wobble map 710 repeats itself after the rotational alidade portion rotates 720 degrees.

With continued reference to FIG. 7, as described previously herein, the tilt predictor determines the rotational orientation of rotational alidade portion 700. For example, rotational alidade portion 700 is in the rotational orientation designated by 702. In one embodiment, the tilt predictor automatically calculates an adjustment factor based on the degree of tilt from wobble map 710 corresponding to axis 702. The tilt predictor then automatically applies the adjustment factor to the degree of tilt corresponding to axis 702 that are predicted by the tilt predictor as previously described herein. In one embodiment, the degree of tilt incorporating the adjustment factor is then automatically written from the tilt predictor to the tilt compensator.

Figure 8:
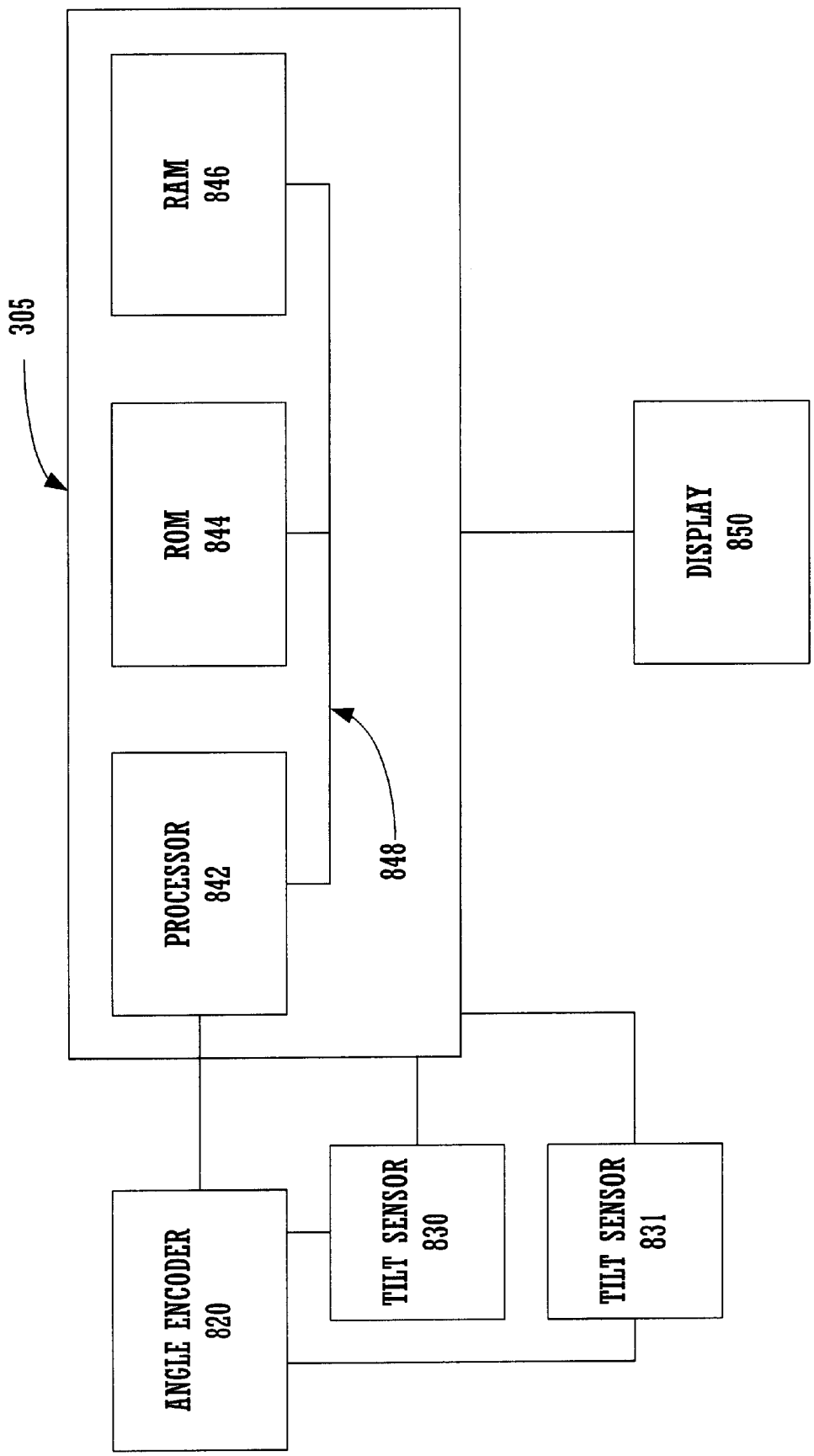
FIG. 8 is a block diagram of a tilt predictor in accordance with one embodiment of the present invention.

With reference now to FIG. 8, the tilt predictor in accordance with one embodiment of the present invention is diagrammed. In this embodiment, angle encoder 820 is coupled to tilt sensors 830 and 831 and to tilt predictor 305. In this embodiment, angle encoder 820 is configured to electronically measure the azimuthal orientation of the rotational alidade portion (not shown). In this embodiment, tilt predictor 305 is comprised of a processor 842 for processing information and instructions and coupled with bus 848, a read-only memory 844 for storing information and instructions for processor 842 and also coupled with bus 848, and a random access memory 846 for storing information and instructions for processor 842 and also coupled with bus 848. Tilt predictor 305 is coupled to display 850, which in this embodiment is a screen that displays the measurement results to the user.

With reference still to FIG. 8, in this embodiment, with the rotational alidade portion in an initial orientation, angle encoder 820 determines the azimuthal position of the rotational alidade portion, and thus the azimuthal position of tilt sensors 830 and 831 are also known. In this embodiment, the angles of tilt are measured using tilt sensors 830 and 831. The azimuthal position and the angles of tilt are written to tilt predictor 305 which computes the inclined horizontal plane in which the rotational alidade portion actually rotates.

With continuing reference to FIG. 8, when the rotational alidade portion is rotated to a new rotational orientation, in this embodiment angle encoder 820 determines the new azimuthal position and writes this information to tilt predictor 305. Tilt predictor 305 computes the horizontal angle of inclination at the new azimuthal position using the previously determined angles of tilt and inclined horizontal plane stored in random-access memory 846.

The present invention thus provides a total station that eliminates the time lag associated with determining the degree of tilt of the rotational alidade portion after the rotational alidade portion has been rotated to a new rotational orientation. The present invention also displays precise measurement results to a user without the aforementioned time lag. The present invention also provides a total station that automatically determines the degree of tilt of the rotational alidade portion, and applies the degree of tilt in the total station tilt compensator. The present invention further provides a total station that accomplishes the above, and is user-friendly and compatible with the current practices and training of those currently using total stations.

The preferred embodiment of the present invention, a total station incorporating tilt prediction, is thus described. While the present invention has been described in particular embodiments, it should be appreciated that the present invention should not be construed as limited by such embodiments, but rather construed according to the following claims.

What is claimed is:

1. A measurement apparatus comprising:
   a total station having a central axis of rotation, said total station further comprising:
      a rotational alidade portion adapted to rotate about said central axis,
      an electronic distance measuring portion coupled to said rotational alidade portion,
      a tilt sensor coupled to said rotational alidade portion, and
      a tilt predictor adapted to predict degree of tilt of said rotational alidade portion corresponding to a rotational orientation of said rotational alidade portion.

2. The measurement apparatus of claim 1 wherein said tilt predictor is adapted to define a plane of rotation about said central axis.

3. The measurement apparatus of claim 2 wherein said tilt predictor is adapted to determine a rotational orientation of said rotational alidade portion within said plane of rotation.

4. The measurement apparatus of claim 3 wherein said tilt predictor is adapted to predict degree of tilt of said plane of rotation at said rotational orientation.

5. The measurement apparatus of claim 1 further comprising:
   a tilt compensator coupled to said tilt predictor.

6. The measurement apparatus of claim 5 wherein said tilt predictor is adapted to communicate said degree of tilt of said rotational alidade portion to said tilt compensator.

7. The measurement apparatus of claim 6 wherein said tilt compensator is adapted to apply a compensation factor to said electronic distance measuring portion, said compensation factor introduced by said degree of tilt of said rotational alidade.

8. The measurement apparatus of claim 1 wherein said rotational alidade portion is mounted on bearings.

9. The measurement apparatus of claim 8 wherein said tilt predictor is adapted to apply an adjustment factor to said degree of tilt of said rotational alidade portion, said adjustment factor introduced by said bearings on which said rotational alidade portion is mounted.

10. A method for predicting a degree of tilt of a rotational alidade portion of a total station, said predicted degree of tilt corresponding to a selected rotational orientation of said rotational alidade portion, said method comprising the steps of:

a) defining a plane of rotation for said rotational alidade portion;

b) determining a rotational orientation of said rotational alidade portion; and c) predicting said degree of tilt of said rotational alidade portion at said selected rotational orientation.

11. The method as recited in claim 10 wherein step a) further comprises defining said plane of rotation for said rotational alidade portion with said rotational alidade portion at an initial rotational orientation.

12. The method as recited in claim 10 wherein step a) further comprises updating said plane of rotation for said rotational alidade portion with said rotational alidade portion at said selected rotational orientation.

13. The method as recited in claim 10 wherein step a) further comprises defining said plane of rotation using a tilt sensor of said total station.

14. The method as recited in claim 10 wherein step b) further comprises measuring the amount of rotation from a prerequisite rotational orientation to said selected rotational orientation.

15. The method as recited in claim 13 wherein said prerequisite rotational orientation is an initial rotational orientation of said rotational alidade portion.

16. The method as recited in claim 10 wherein step c) further comprises:

c1) determining an adjustment factor for said degree of tilt of said plane of rotation, said adjustment factor introduced by bearings on which said rotational alidade portion is mounted; and c2) applying said adjustment factor to more precisely determine said degree of tilt of said rotational alidade portion at said selected rotational orientation.

17. The method as recited in claim 10 further comprising the step of:

d) determining a compensation factor for said rotational alidade portion of said total station using said predicted degree of tilt of said rotational alidade portion for said selected rotational orientation.

18. A method for predicting a degree of tilt of a rotational alidade portion of a total station, said predicted degree of tilt corresponding to a selected rotational orientation of said rotational alidade portion, said method comprising the steps of:

a) defining a plane of rotation for said rotational alidade portion;

b) determining a rotational orientation of said rotational alidade portion;

c) predicting said degree of tilt of said rotational alidade portion at said selected rotational orientation; and d) determining a compensation factor for said rotational alidade portion of said total station using said predicted degree of tilt of said rotational alidade portion for said selected rotational orientation.

19. The method as recited in claim 18 wherein step a) further comprises defining said plane of rotation for said rotational alidade portion with said rotational alidade portion at an initial rotational orientation.

20. The method as recited in claim 18 wherein step a) further comprises updating said plane of rotation for said rotational alidade portion with said rotational alidade portion at said selected rotational orientation.

21. The method as recited in claim 18 wherein step a) further comprises defining said plane of rotation using a tilt sensor of said total station.

22. The method as recited in claim 18 wherein step b) further comprises measuring the amount of rotation from a prerequisite rotational orientation to said selected rotational orientation.

23. The method as recited in claim 22 wherein said prerequisite rotational orientation is an initial rotational orientation of said rotational alidade portion.

24. The method as recited in claim 18 wherein step c) further comprises:

c1) determining an adjustment factor for said degree of tilt of said plane of rotation, said adjustment factor introduced by bearings on which said rotational alidade portion is mounted; and c2) applying said adjustment factor to more precisely determine said degree of tilt of said rotational alidade portion at said selected rotational orientation.

* * * * *